(12) United States Patent
Hyodo et al.

(10) Patent No.: US 9,458,605 B2
(45) Date of Patent: Oct. 4, 2016

(54) WORK VEHICLE

(71) Applicants: Hitachi Construction Machinery Co., Ltd., Bunkyo-ku, Tokyo (JP); Kabushiki Kaisha KCM, Kako-gun, Hyogo (JP)

(72) Inventors: Koji Hyodo, Kasumigaura (JP); Takashi Takeyama, Ryugasaki (JP); Tetsuji Tanaka, Abiko (JP); Isamu Aoki, Tsukuba (JP); Katsutaka Hara, Toride (JP); Tatsuo Oouchi, Ryugasaki (JP)

(73) Assignees: Hitachi Construction Machinery Co., Ltd., Tokyo (JP); KABUSHIKI KAISHA KCM, Hyogo (JP)

( * ) Notice: Subject to any disclaimer, the term of this patent is extended or adjusted under 35 U.S.C. 154(b) by 39 days.

(21) Appl. No.: 14/504,678

(22) Filed: Oct. 2, 2014

(65) Prior Publication Data
US 2015/0098783 A1 Apr. 9, 2015

(30) Foreign Application Priority Data
Oct. 3, 2013 (JP) .................................. 2013-208251

(51) Int. Cl.
*E02F 9/22* (2006.01)
*F01N 11/00* (2006.01)
(Continued)

(52) U.S. Cl.
CPC .............. *E02F 9/2246* (2013.01); *E02F 3/283* (2013.01); *E02F 9/0883* (2013.01); *E02F 9/226* (2013.01); *E02F 9/2235* (2013.01); *E02F 9/2296* (2013.01); *F01N 3/208* (2013.01);
(Continued)

(58) Field of Classification Search
CPC ....... E02F 9/2246; E02F 9/2296; E02F 3/283; E02F 9/0883; E02F 9/2235; E02F 9/226; F01N 3/208; F01N 2900/08; F01N 2900/0412; F01N 2590/08; F01N 2550/05; F01N 2900/1814; F01N 11/00; F02D 41/0235; F02D 2250/36; F02D 2250/26; F02D 31/001; F02D 41/021; F02D 2250/18; F02D 2200/101; Y02T 10/24
USPC ........................................................ 701/50
See application file for complete search history.

(56) References Cited

U.S. PATENT DOCUMENTS 8,316,636 B2 * 11/2012 Nakamura ...................... 60/295

FOREIGN PATENT DOCUMENTS

EP    1 688 599 A1    8/2006
EP    2 022 954 A1    2/2009
(Continued)

OTHER PUBLICATIONS

European Search Report dated Feb. 6, 2015 (Five (5) pages).

*Primary Examiner* — Brian P Sweeney
(74) *Attorney, Agent, or Firm* — Crowell & Moring LLP

(57) ABSTRACT

A work vehicle including a front work device, contains: a variable displacement hydraulic pump that is driven by an engine and supplies pressure oil to an actuator that drives the front work device; an exhaust gas purification device that purifies nitrogen oxide in exhaust gas discharged from the engine using a reducing agent solution stored in a reducing agent tank; a remaining amount detection device that detects a remaining amount of the reducing agent solution in the reducing agent tank; and a control unit that decreases output torque of the engine and also decreases a rotational speed of the engine in a rated point according to decrease of the remaining amount of the reducing agent solution detected by the remaining amount detection device.

4 Claims, 15 Drawing Sheets

(51) Int. Cl.
*F02D 41/02* (2006.01)
*E02F 3/28* (2006.01)
*E02F 9/08* (2006.01)
*F01N 3/20* (2006.01)
*F02D 31/00* (2006.01)

(52) U.S. Cl.
CPC ......... F02D 31/001 (2013.01); F02D 41/021 (2013.01); *F01N 11/00* (2013.01); *F01N 2550/05* (2013.01); *F01N 2590/08* (2013.01); *F01N 2900/0412* (2013.01); *F01N 2900/08* (2013.01); *F01N 2900/1814* (2013.01); *F02D 41/0235* (2013.01); *F02D 2200/101* (2013.01); *F02D 2250/18* (2013.01); *F02D 2250/26* (2013.01); *F02D 2250/36* (2013.01); *Y02T 10/24* (2013.01)

(56) References Cited

FOREIGN PATENT DOCUMENTS

| EP | 2 151 528 A1 | 2/2010 |
| JP | 2002-371831 A | 12/2002 |
| JP | 2006-283656 A | 10/2006 |
| JP | 4847218 B2 | 12/2011 |
| JP | 4847219 B2 | 12/2011 |

* cited by examiner

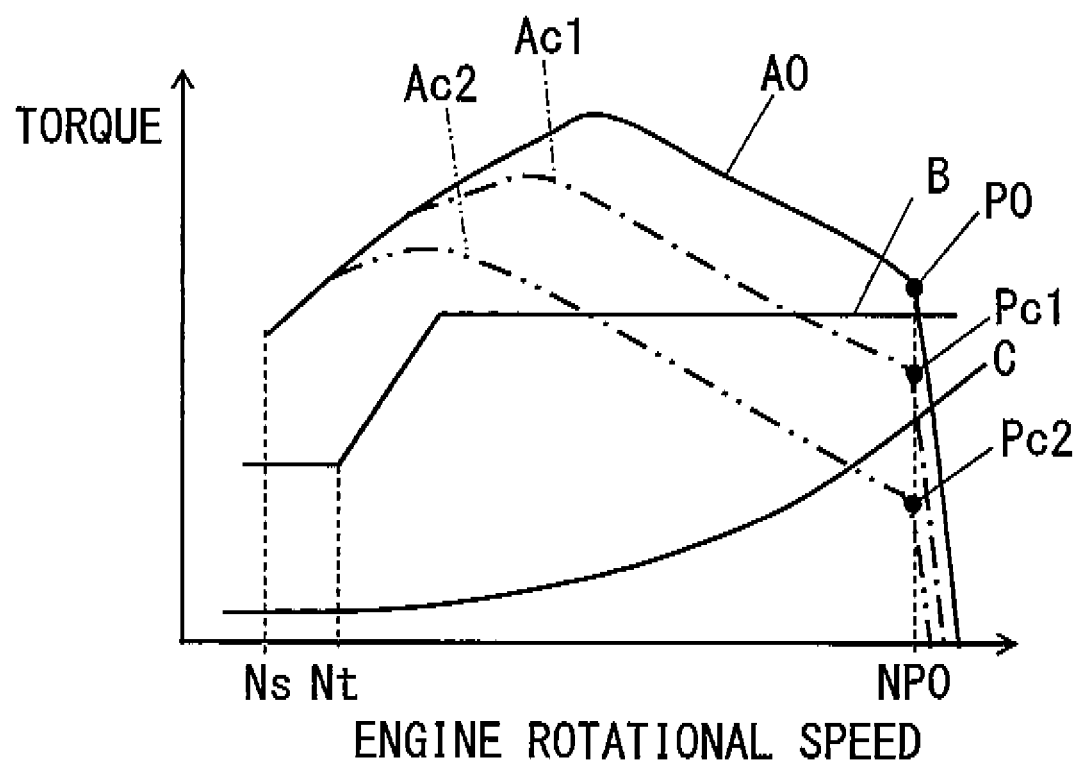

WORK VEHICLE

INCORPORATION BY REFERENCE

The disclosure of the following priority application is herein incorporated by reference: Japanese Patent Application No. 2013-208251 filed Oct. 3, 2013.

BACKGROUND OF THE INVENTION

1. Field of the Invention

The present invention relates to a work vehicle provided with an exhaust gas purification device that purifies exhaust gas discharged from an engine that drives a hydraulic pump.

2. Description of Related Art

There has been known an automobile provided with an exhaust gas purification device that reduces nitrogen oxide in exhaust gas and removes it (refer to Japanese Laid-Open Patent Publication No. 2002-371831). In the automobile described in Japanese Laid-Open Patent Publication No. 2002-371831, when a reducing agent solution (urea water) in a tank is consumed, and a remaining amount of the reducing agent solution becomes not more than a prescribed amount, an engine control unit controls an engine to a low output, and prevents high-output operation.

SUMMARY OF THE INVENTION

Since a technology described in the above-mentioned Japanese Laid-Open Patent Publication No. 2002-371831 is the technology in the automobile, it cannot be applied as it is to a work vehicle, such as a wheel loader. The work vehicle, such as the wheel loader has a hydraulic pump driven by an engine, and supplies pressure oil to an actuator of a front work device including an arm, a bucket, etc. For this reason, a relation between an output of the engine and an output of the hydraulic pump is important in the work vehicle.

In the work vehicle, a load of the engine changes according to an operation state (a work state and a traveling state) of the vehicle, such as a state of traveling without driving the front work device, a state of driving the front work device while making the vehicle travel, or a state of driving the front work device in a stopped state. When the technology described in the above-mentioned Japanese Laid-Open Patent Publication No. 2002-371831 is applied to control the engine to the low output according to decrease of the urea water remaining amount, a change amount of an engine rotational speed at the time of change of the operation state of the vehicle becomes large, and movement of the vehicle might be jerky. In addition, when the change amount of the engine rotational speed at the time of the change in the operation state of the vehicle becomes large, fuel consumption might get worse.

According to the 1st aspect of the present invention, a work vehicle including a front work device, comprises: a variable displacement hydraulic pump that is driven by an engine and supplies pressure oil to an actuator that drives the front work device; an exhaust gas purification device that purifies nitrogen oxide in exhaust gas discharged from the engine using a reducing agent solution stored in a reducing agent tank; a remaining amount detection device that detects a remaining amount of the reducing agent solution in the reducing agent tank; and a control unit that decreases output torque of the engine and also decreases a rotational speed of the engine in a rated point according to decrease of the remaining amount of the reducing agent solution detected by the remaining amount detection device.

According to the 2nd aspect of the present invention, in the work vehicle according to the 1st aspect, it is preferred that the work vehicle further comprises a rotational speed detection unit that detects an actual rotational speed of the engine, and when the actual rotational speed of the engine detected by the rotational speed detection unit is not more than a first threshold value, the control unit does not decrease the output torque of the engine regardless of the remaining amount of the reducing agent solution detected by the remaining amount detection device.

According to the 3rd aspect of the present invention, in the work vehicle according to the 2nd aspect, it is preferred that the control unit sets maximum absorption torque of the hydraulic pump to be a minimum in a range where the actual rotational speed of the engine detected by the rotational speed detection unit is less than a second threshold value, sets the maximum absorption torque of the hydraulic pump to be a maximum in a range where the actual rotational speed of the engine is not less than a third threshold value, and gradually increases the maximum absorption torque of the hydraulic pump according to rise of the actual rotational speed in a range where the actual rotational speed of the engine is not less than the second threshold value and less than the third threshold value.

According to the 4th aspect of the present invention, in the work vehicle according to any one of the 1st to 3rd aspects, it is preferred that the output torque of the engine is decreased in stages according to the decrease of the remaining amount of the reducing agent solution detected by the remaining amount detection device.

BRIEF DESCRIPTION OF THE DRAWINGS

FIGS. 8A, 8B, and 8C are torque diagrams of a wheel loader according to a comparative example;

DESCRIPTION OF EMBODIMENTS

Hereinafter, one embodiment of a work vehicle according to the present invention will be explained with reference to drawings.

First Embodiment

Figure 1:
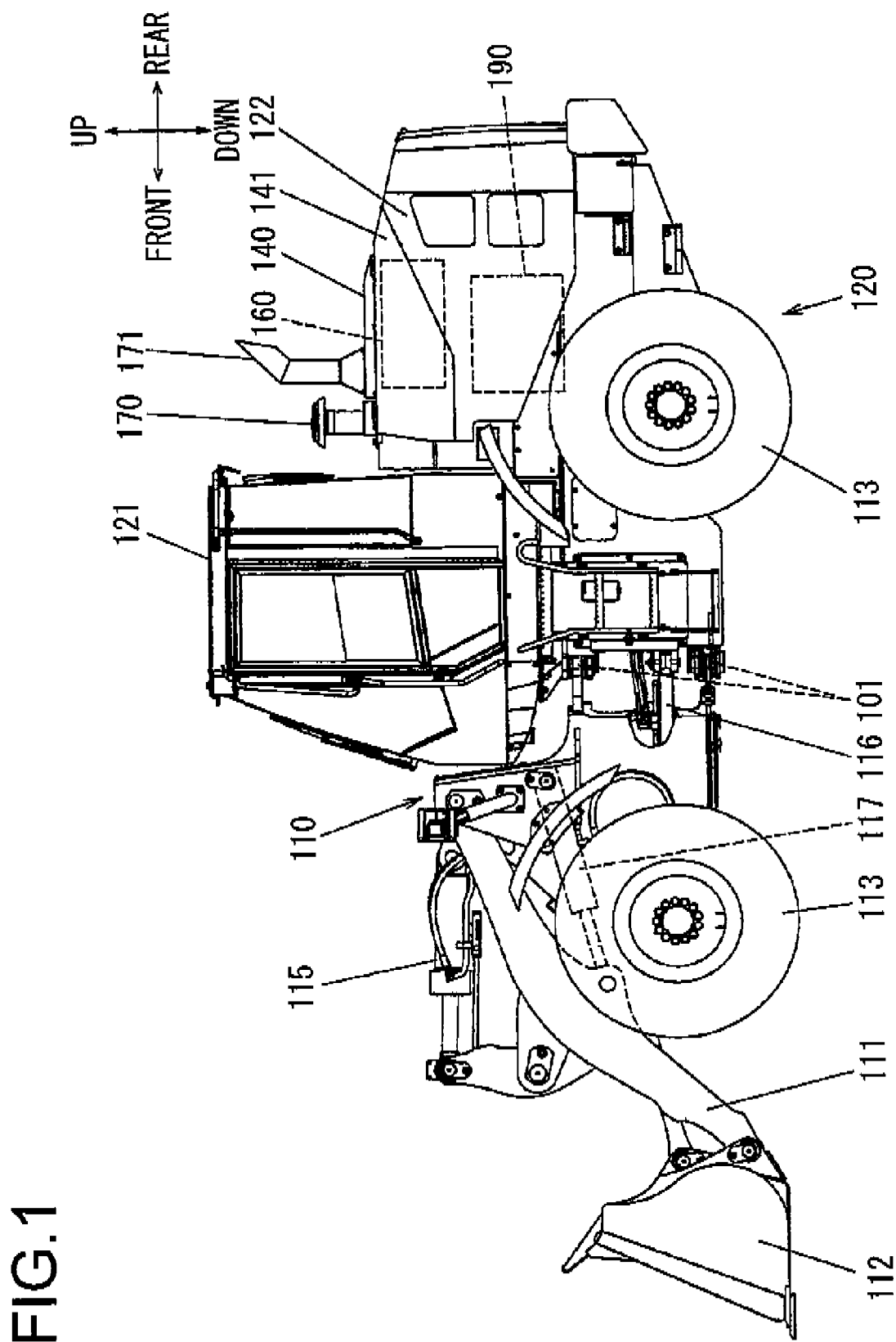
FIG. 1 is a side view of a wheel loader that is one example of a work vehicle according to a first embodiment of the present invention.

FIG. 1 is a side view of a wheel loader that is one example of a work vehicle according to a first embodiment. The wheel loader includes: a front vehicle body 110 having an arm 111, a bucket 112, front wheels, etc.; and a rear vehicle body 120 having an operator's cab 121, a machine room 122, rear wheels, etc.

The arm 111 turns (rises and lowers) in a up and down, (vertical) direction by drive of an arm cylinder 117, and the bucket 112 turns (crowds or dumps) in the up and down (vertical) direction by drive of a bucket cylinder 115. The front vehicle body 110 and the rear vehicle body 120 are turnably coupled to each other by center pins 101, and the front vehicle body 110 bends from side to side with respect to the rear vehicle body 120 by expansion and contraction of a steering cylinder 116.

An upper side of the machine room 122 is covered with an engine hood 140, and sides thereof are covered with an openable housing cover 141. To the engine hood 140, attached are an air intake pipe 170 for taking in the air needed for drive of an engine 190 from outside, and a tail pipe 171 for discharging exhaust gas. The engine 190 and an exhaust gas purification device (an exhaust emission control device) 160 are arranged in the machine room 122.

Figure 2:
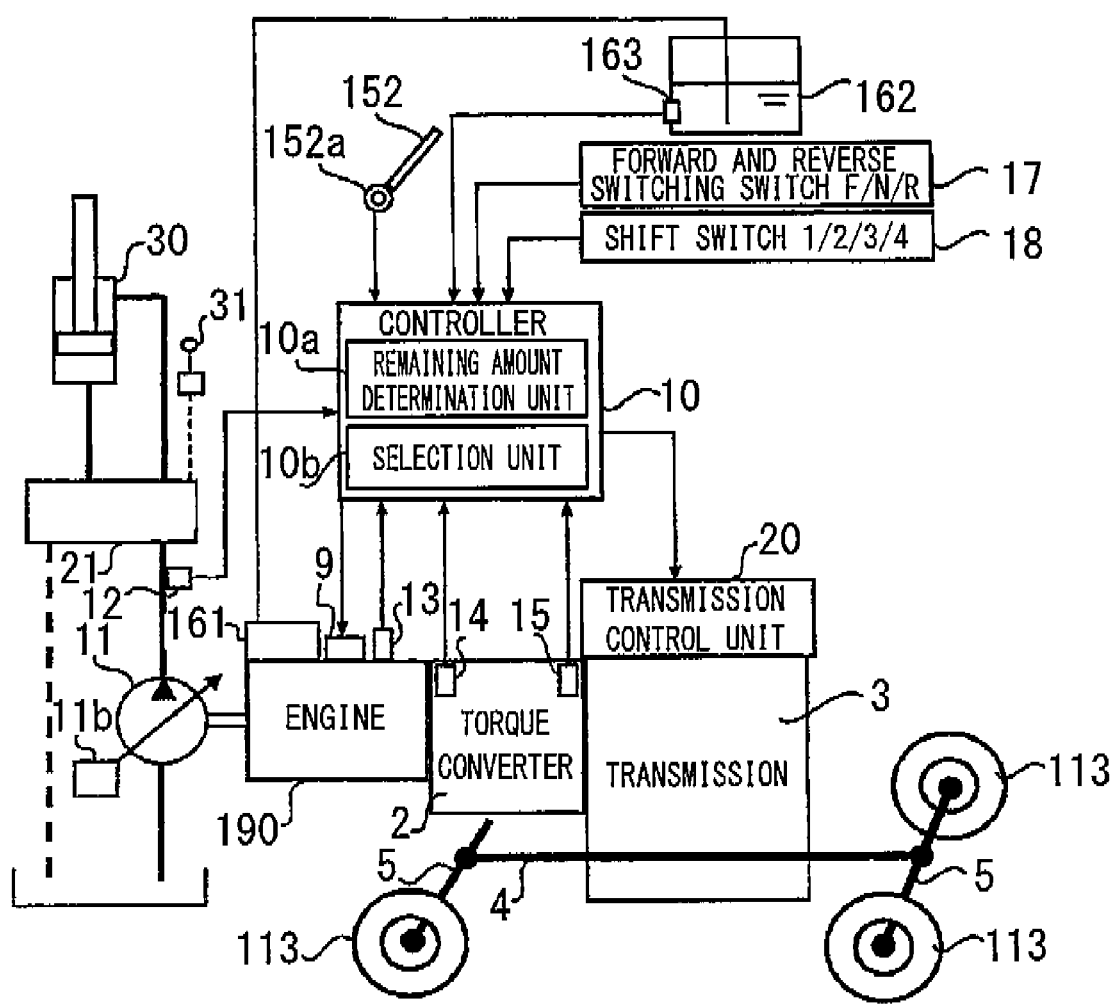
FIG. 2 is a diagram showing a schematic configuration of the wheel loader according to the first embodiment of the present invention.

FIG. 2 is a diagram showing a schematic configuration of the wheel loader. The wheel loader is provided with a traveling drive device (a traveling system) that transmits rotation of the engine 190 to tires 113 through a torque converter (described as a tor-con 2), a transmission 3, a propeller shaft 4, and axles 5. An input shaft of the torque converter 2 is coupled to an output shaft of the engine 190, and an output shaft of the torque converter 2 is coupled to the transmission 3. The torque converter 2 is a fluid clutch including well-known impeller, turbine, and stator, and the rotation of the engine 190 is transmitted to the transmission 3 through the torque converter 2. The transmission 3 has a clutch that switches a speed stage thereof from first to fourth speeds, and rotation of the output shaft of the torque converter 2 is shifted by the transmission 3. The shifted rotation is transmitted to the tires 113 through the propeller shaft 4 and the axles 5, and the wheel loader travels.

The wheel loader is provided with a front work device (a work system) configured to include: a hydraulic pump 11; a control valve 21; an actuator 30; the arm 111; and the bucket 112. The working hydraulic pump 11 is driven by the engine 190, and discharges pressure oil. The hydraulic pump 11 is a swash plate type or a bent axis type variable displacement hydraulic pump in which a displacement is changed. A discharge flow amount of the hydraulic pump 11 is decided according to the displacement and a rotational speed of the hydraulic pump 11. A regulator 11b adjusts the displacement so that absorption torque of the hydraulic pump 11 does not exceed maximum pump absorption torque set by a controller 10.

The pressure oil discharged from the hydraulic pump 11 is supplied to the working actuator 30 through the control valve 21, and the actuator 30 is driven. The control valve 21 is operated with a control lever 31, and controls a flow of the pressure oil from the hydraulic pump 11 to the actuator 30. Note that in FIG. 2, for convenience, an arm operation lever and a bucket operation lever are collectively described as the control lever 31, the arm cylinder 117 and the bucket cylinder 115 are collectively described as the actuator 30, and an arm control valve or a bucket control valve is collectively described as the control valve 21. The arm operation lever outputs a raising/lowering command of the arm 111, and the bucket operation lever outputs a tilting/dumping command of the bucket 112.

The torque converter 2 has a function to increase output torque with respect to input torque, i.e., a function to set a torque ratio to be not less than one. The torque ratio becomes smaller along with increase in a torque converter speed ratio e (=an output rotational speed No/an input rotational speed Ni), which is a ratio of the rotational speed Ni of the input shaft of the torque converter 2 and the rotational speed No of the output shaft thereof. For example, when a traveling load becomes large during traveling in a state where an engine rotational speed is constant, the rotational speed No of the output shaft of the torque converter 2 decreases, i.e., a vehicle speed decreases, and the torque converter speed ratio e becomes small. At this time, since the torque ratio increases, the vehicle can travel with a larger traveling drive force (traction force).

The transmission 3 is an automatic transmission that has solenoid valves corresponding to respective speed stages of first to fourth speeds. These solenoid valves are driven by a control signal output from the controller 10 to the transmission control unit 20, and the transmission 3 is shifted according to the control signal. In the present embodiment, the speed stage of the transmission 3 is controlled by torque converter speed ratio reference control in which gear-shifting is performed when the torque converter speed ratio e reaches a predetermined value.

The exhaust gas purification device 160 is provided with: a treatment device 161 that performs treatment to purify nitrogen oxide in exhaust gas discharged from the engine 190, for example, using a urea water solution (hereinafter described as urea water) as a reducing agent solution; a urea water tank 162 for storing urea water supplied to the treatment device 161; and a remaining amount sensor 163 that detects a remaining amount of the urea water in the urea water tank 162.

The controller 10 is configured to include an arithmetic processing device having a CPU, a ROM and a RAM, which are storage devices, other peripheral circuits, etc. To the controller 10, connected are a rotational speed detector 14 that detects the rotational speed Ni of the input shaft of the torque converter 2, and a rotational speed detector 15 that detects the rotational speed No of the output shaft of the torque converter 2.

The controller 10 calculates the torque converter speed ratio e (=the output rotational speed No/the input rotational speed Ni) based on the rotational speed Ni of the input shaft of the torque converter 2 detected by the rotational speed detector 14, and the rotational speed No of the output shaft of the torque converter 2 detected by the rotational speed detector 15.

As shown in FIG. 2, a forward and reverse switching switch 17 that commands advance and back movement of the vehicle is connected to the controller 10, and an operation position (forward (F)/neutral (N)/reverse (R)) of the forward and reverse switching switch 17 is detected by the controller 10. When the forward and reverse switching switch 17 is switched to a forward (F) position, the controller 10 outputs to the transmission control unit 20 a control signal for making a forward clutch (not shown) of the transmission 3 in an engagement state. When the forward and reverse switching switch 17 is switched to a reverse (R) position, the controller 10 outputs to the transmission control unit 20 a control signal for making a reverse clutch (not shown) of the transmission 3 in an engagement state.

When the control signal for making the forward or reverse clutch (not shown) in the engagement state is received in the transmission control unit 20, a clutch control valve (not shown) provided at the transmission control unit 20 operates, the forward or reverse clutch (not shown) is made in the engagement state, and a traveling direction of the work vehicle is switched to a forward or reverse side.

When the forward and reverse switching switch 17 is switched to a neutral (N) position, the controller 10 outputs to the transmission control unit 20 a control signal for making the forward and reverse clutches (not shown) in release states. Consequently, the forward and reverse clutches (not shown) are made in the release states, and the transmission 3 becomes a neutral state.

A shift switch 18 that commands an upper limit of the speed stage among the first to fourth speeds is connected to the controller 10, and the transmission 3 is automatically shifted with the speed stage selected by the shift switch 18 as the upper limit. For example, the speed stage becomes the first speed or the second speed when the second speed is selected by the shift switch 18, and the speed stage is fixed to the first speed when the first speed is selected.

To the controller 10, connected are an accelerator operation amount detector 152a that detects a pedal operation amount (a pedal stroke or a pedal angle) of an accelerator pedal 152, and a rotational speed sensor 13 that detects an actual rotational speed of the engine 190 and outputs an actual rotational speed signal to the controller 10.

The controller 10 sets a target engine rotational speed of the engine 190 according to the pedal operation amount (stepping amount) of the accelerator pedal 152 detected by the accelerator operation amount detector 152a. When the pedal operation amount of the accelerator pedal 152 becomes large, the target engine rotational speed becomes large, and the target engine rotational speed at the time of maximum pedal stepping becomes a rated rotational speed in a rated point, which will be mentioned later.

The controller 10 outputs a control signal corresponding to a set target engine rotational speed to an engine controller 9. The engine controller 9 compares the actual rotational speed of the engine 190 detected by the rotational speed sensor 13 with the target engine rotational speed from the controller 10, and controls a fuel injection device (not shown) in order to bring the actual rotational speed of the engine 190 close to the target engine rotational speed.

To the controller 10, connected is the remaining amount sensor 163 that detects a remaining amount of the urea water in the urea water tank 162 and outputs a remaining amount signal to the controller 10. The remaining amount sensor 163 is a water level sensor that detects a water level of the urea water in the urea water tank 162. To the controller 10, connected is a pressure sensor 12 that detects a discharge pressure (a load pressure) of the hydraulic pump 11 and outputs a pressure signal to the controller 10.

FIGS. 3A, 3B, 4A, and 4B are torque diagrams of the wheel loader according to the first embodiment, they show relations between an engine rotational speed and torque when the accelerator pedal 152 is stepped at the maximum, and show an engine output torque characteristic, a pump absorption torque characteristic, and a torque converter input torque characteristic. A plurality of engine output torque characteristics A0, A1, and A2, and a pump absorption torque characteristic B are stored in the storage device of the controller 10 in a form of a lookup table. As will be mentioned later, the characteristic A0 is used when the remaining amount of the urea water is not less than a first predetermined amount (an unlimited stage (or phase)), the characteristic A1 is used when the remaining amount of the urea water is less than the first predetermined amount and not less than a second predetermined amount (a first limited stage (or phase)), and the characteristic A2 is used when the remaining amount of the urea water is less than the second predetermined amount (a second limited stage (or phase)).

The engine output torque characteristics A0, A1, and A2 show relations between an engine rotational speed and maximum engine output torque, respectively. Note that the maximum engine output torque means maximum torque that the engine 190 can output in each rotational speed. A region prescribed by an engine output torque characteristic (a maximum torque line) shows performance that the engine 190 can exhibit. The engine mounted in the wheel loader has a droop characteristic in which torque rapidly reduces in a rotational speed region exceeding a rated point (rated highest torque) P0. In FIGS. 3A, 3B, 4A, and 4B, a droop line is defined by a straight line that connects the rated point and an engine maximum rotational speed in a no-load state of the pump. In the wheel loader, matching control is performed utilizing such engine output torque characteristic, and the engine 190 and the hydraulic pump 11 are operated at a matching point, which will be mentioned later.

Figure 3A:
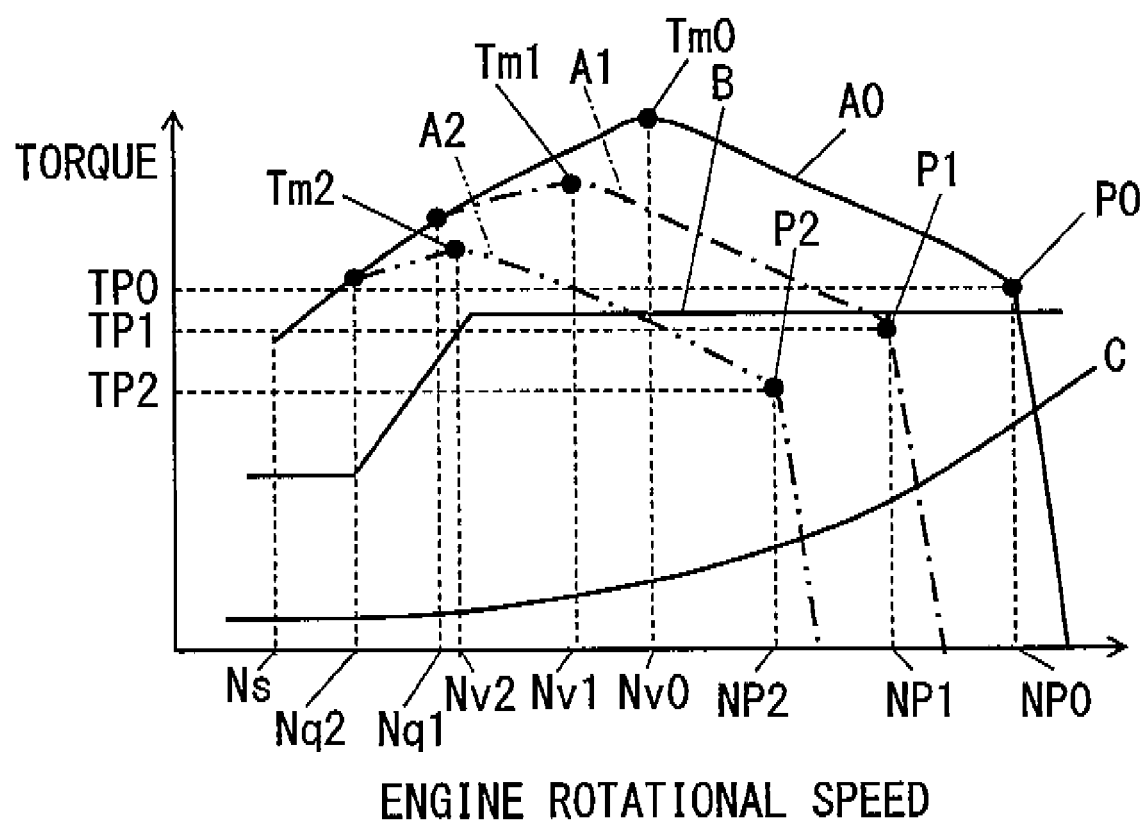
FIGS. 3A and 3B are torque diagrams of the wheel loader according to the first embodiment of the present invention.

As shown in FIG. 3A, in the engine output torque characteristic A0, torque increases according to rise of the engine rotational speed in a range where the engine rotational speed is not less than a minimum rotational speed (a low-idle rotational speed) Ns and not more than Nv0, and torque becomes a maximum value (a maximum torque point Tm0) in the characteristic A0 when the engine rotational speed is Nv0. Note that the low-idle rotational speed is an engine rotational speed at the time of non-operation of the accelerator pedal 152. In the engine output torque characteristic A0, when the engine rotational speed becomes larger than Nv0, torque decreases according to the rise of the engine rotational speed, and when the torque reaches the rated point P0, a rated output can be obtained. When the engine rotational speed rises exceeding a rated rotational speed NP0 in the rated point P0, torque rapidly decreases.

The engine output torque characteristic A1 is the characteristic in which the characteristic A0 has been shifted to low rotation and low torque side, and the engine output torque characteristic A2 is the characteristic in which the characteristic A1 has been further shifted to low rotation and low torque side.

As shown in FIG. 3A, the engine output torque characteristic A1 is the same characteristic as the characteristic A0 in a range where the engine rotational speed is not less than the minimum rotational speed Ns and not more than a threshold value Nq1. The threshold value Nq1 is larger than the minimum rotational speed (low-idle rotational speed) Ns (Nq1>Ns). In the engine output torque characteristic A1, when the engine rotational speed becomes larger than the threshold value Nq1, an increasing rate of the torque according to the rise of the engine rotational speed decreases compared with the characteristic A0. In the engine output torque characteristic A1, when the engine rotational speed is Nv1 smaller than Nv0 (Nv1<Nv0), torque becomes a maximum value (a maximum torque point Tm1) in the characteristic A1. A torque value in the maximum torque point Tm1 is smaller than a torque value of the maximum torque point Tm0 in the characteristic A0. In the engine output torque characteristic A1, when the engine rotational speed becomes larger than Nv1, torque decreases according to the rise of the engine rotational speed.

As shown in FIG. 3A, the engine output torque characteristic A2 is the same characteristic as the characteristic A0 in a range where the engine rotational speed is not less than the minimum rotational speed Ns and not more than a threshold value Nq2. The threshold value Nq2 is larger than the minimum rotational speed (low-idle rotational speed) Ns (Nq2>Ns) and is smaller than the threshold value Nq1 (Nq2<Nq1). In the engine output torque characteristic A2, when the engine rotational speed becomes larger than the threshold value Nq2, the increasing rate of the torque according to the rise of the engine rotational speed decreases compared with the characteristic A0. In the engine output torque characteristic A2, when the engine rotational speed is Nv2 smaller than Nv1 (Nv2<Nv1), torque becomes a maximum value (a maximum torque point Tm2) in the characteristic A2. A torque value in the maximum torque point Tm2 is smaller than a torque value of the maximum torque point Tm1 in the characteristic A1. In the engine output torque characteristic A2, when the engine rotational speed becomes larger than Nv2, torque decreases according to the rise of the engine rotational speed.

Reference characters P0, P1, and P2 are rated points at which rated outputs can be obtained in the characteristics A0, A1, and A2, respectively. An engine rotational speed in the rated point P0 is NP0, an engine rotational speed in the rated point P1 is NP1 smaller than NP0, and an engine rotational speed in the rated point P2 is NP2 smaller than NP1 (NP2<NP1<NP0). A torque value in the rated point P0 is TP0, a torque value in the rated point P1 is TP1 smaller than TP0, and a torque value in the rated point P2 is TP2 smaller than TP1 (TP2<TP1<TP0).

Figure 3B:
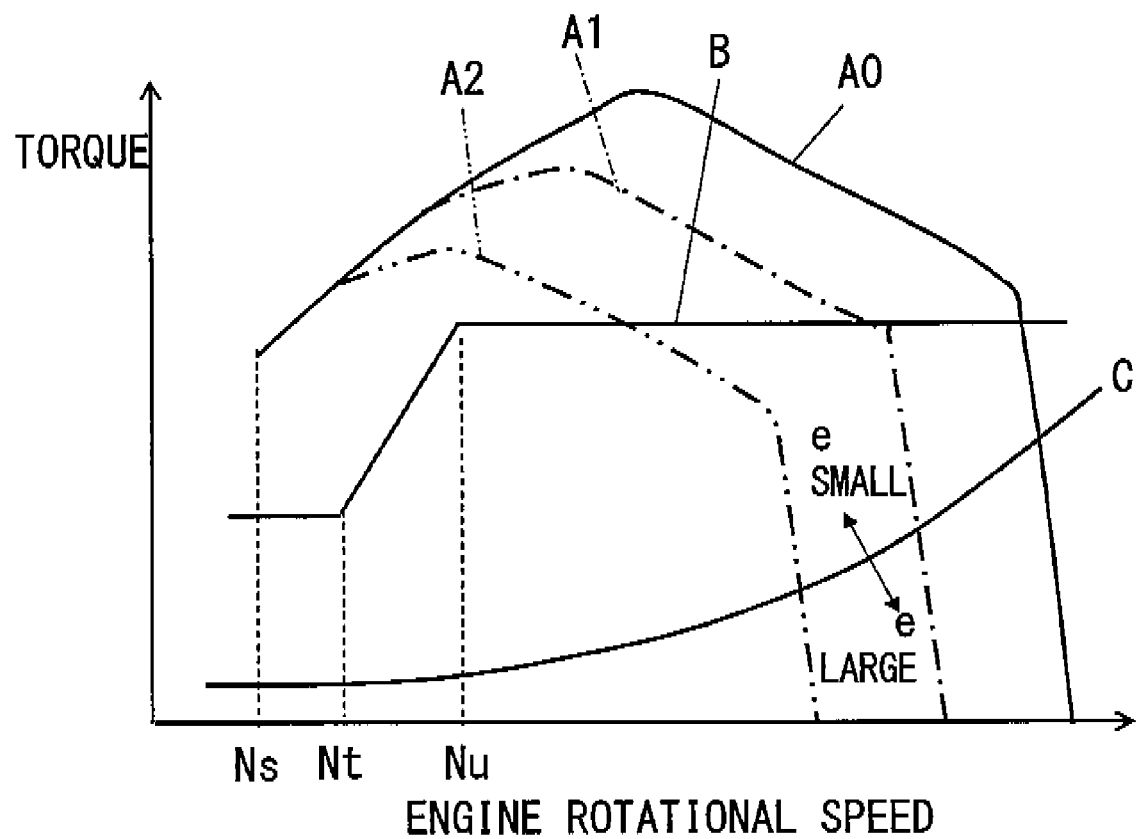

The pump absorption torque characteristic B shows a relation between an engine rotational speed and maximum pump absorption torque (maximum pump input torque). As shown in FIG. 3B, in the pump absorption torque characteristic B, torque becomes a minimum value in the characteristic B regardless of the engine rotational speed in a range where the engine rotational speed is not less than the minimum rotational speed Ns and less than a threshold value Nt. In the characteristic B, torque becomes a maximum value in the characteristic B regardless of the engine rotational speed in a range where the engine rotational speed is not less than a threshold value Nu. In the characteristic B, torque gradually increases according to the rise of the engine rotational speed in a range where the engine rotational speed is not less than the threshold value Nt and less than the threshold value Nu.

A characteristic C representatively shows a characteristic of input torque of the torque converter 2 (hereinafter described as torque converter input torque) when the torque converter speed ratio e is a predetermined value e1 (0<e1<1). The torque converter input torque increases in proportion to a square of the rotational speed Ni of the torque converter input shaft, and becomes smaller as the torque converter speed ratio e becomes larger as shown by an arrow of FIG. 3B.

Figure 4A:
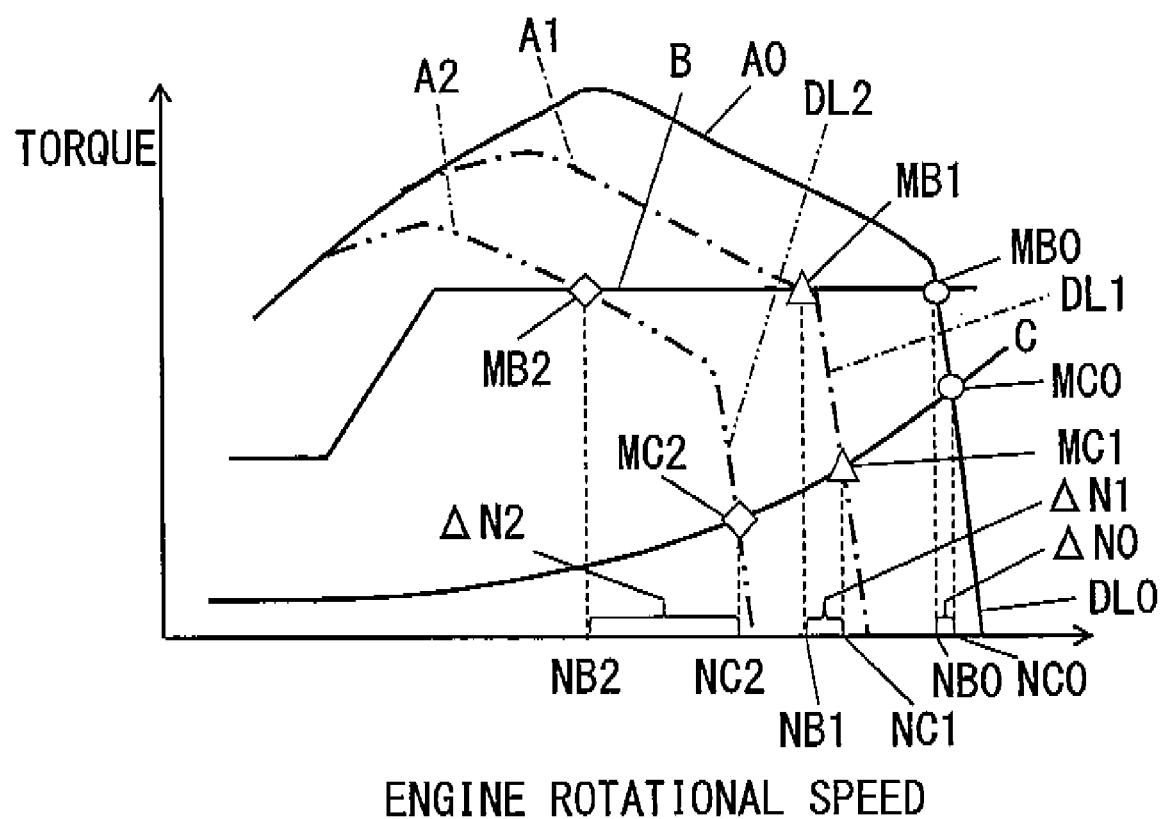
FIGS. 4A and 4B are torque diagrams of the wheel loader according to the first embodiment of the present invention.

As shown in FIG. 4A, intersections MC0, MC1, and MC2 of each of the characteristics A0, A1, and A2 with the characteristic C, and intersections MB0, MB1, and MB2 of each of the characteristics A0, A1, and A2 with the characteristic B are matching points.

Engine output torque and torque converter input torque in a state (hereinafter described as a traveling system single operation state) where the traveling drive device (traveling system) is actuated without actuating the front work device (work system) become values of the intersections MC0, MC1, and MC2. Engine output torque and a pump absorption torque characteristic in a state (hereinafter described as a work system single operation state) where the front work device (work system) is actuated without actuating the traveling drive device (traveling system) become values of the intersections MB0, MB1, and MB2.

Figure 4B:
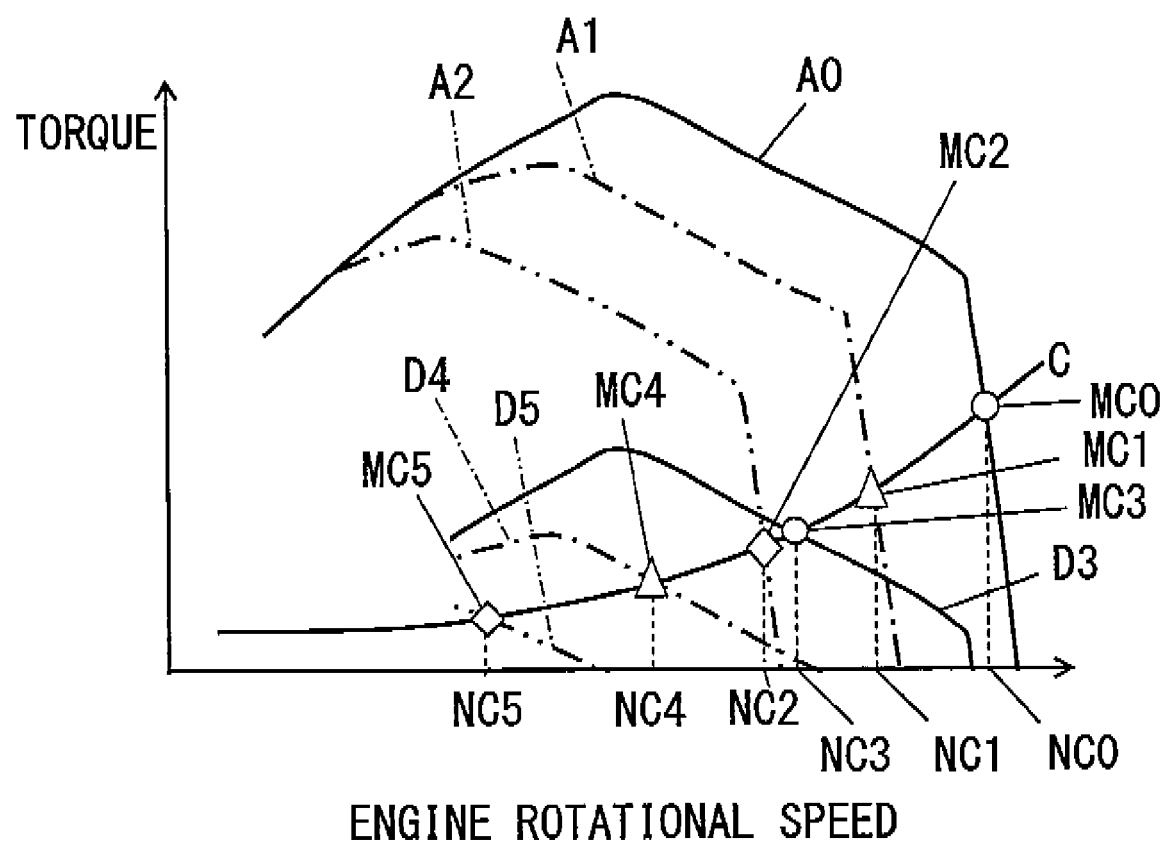

FIG. 4B is the torque diagram in which characteristics D3, D4, and D5 are additionally described to the torque diagram of FIG. 4A, and in which the pump absorption torque characteristic B is omitted. The characteristic D3 is the characteristic in which pump absorption torque represented by the characteristic B is subtracted from the characteristic A0, the characteristic D4 is the characteristic in which the pump absorption torque represented by the characteristic B is subtracted from the characteristic A1, the characteristic D5 is the characteristic in which the pump absorption torque represented by the characteristic B is subtracted from the characteristic A2, and they are engine output torque usable in the traveling system, respectively.

Engine output torque and torque converter input torque in a state (hereinafter described as a compound operation state) where the front work device (work system) and the traveling drive device (traveling system) are actuated in a compound manner become values of intersections MC3, MC4, and MC5.

As shown in FIG. 2, the controller 10 is functionally provided with a remaining amount determination unit 10a and a selection unit 10b. The remaining amount determination unit 10a determines whether a remaining amount (water level) h of the urea water detected by the remaining amount sensor 163 is not less than or less than a predetermined amount. If the remaining amount h of the urea water is not less than a first predetermined amount h1, i.e., if the urea water is sufficiently stored, the remaining amount determination unit 10a determines the urea water to be in the unlimited stage. If the remaining amount h of the urea water is less than the first predetermined amount h1 and not less than a second predetermined amount h2, the remaining amount determination unit 10a determines the urea water to be in the first limited stage. If the remaining amount h of the urea water is less than the second predetermined amount h2, the remaining amount determination unit 10a determines the urea water to be in the second limited stage. Information on the first predetermined amount h1, and the second predetermined amount h2 smaller than the first predetermined amount h1 is previously stored in the storage device of the controller 10.

The selection unit 10b selects the engine output torque characteristic according to a result determined by the remaining amount determination unit 10a. If the urea water is determined to be in the unlimited stage by the remaining amount determination unit 10a, the selection unit 10b selects the engine output torque characteristic A0. If the urea water is determined to be in the first limited stage by the remaining amount determination unit 10a, the selection unit 10b selects the engine output torque characteristic A1. If the urea water is determined to be in the second limited stage by the remaining amount determination unit 10a, the selection unit 10b selects the engine output torque characteristic A2.

Figure 5:
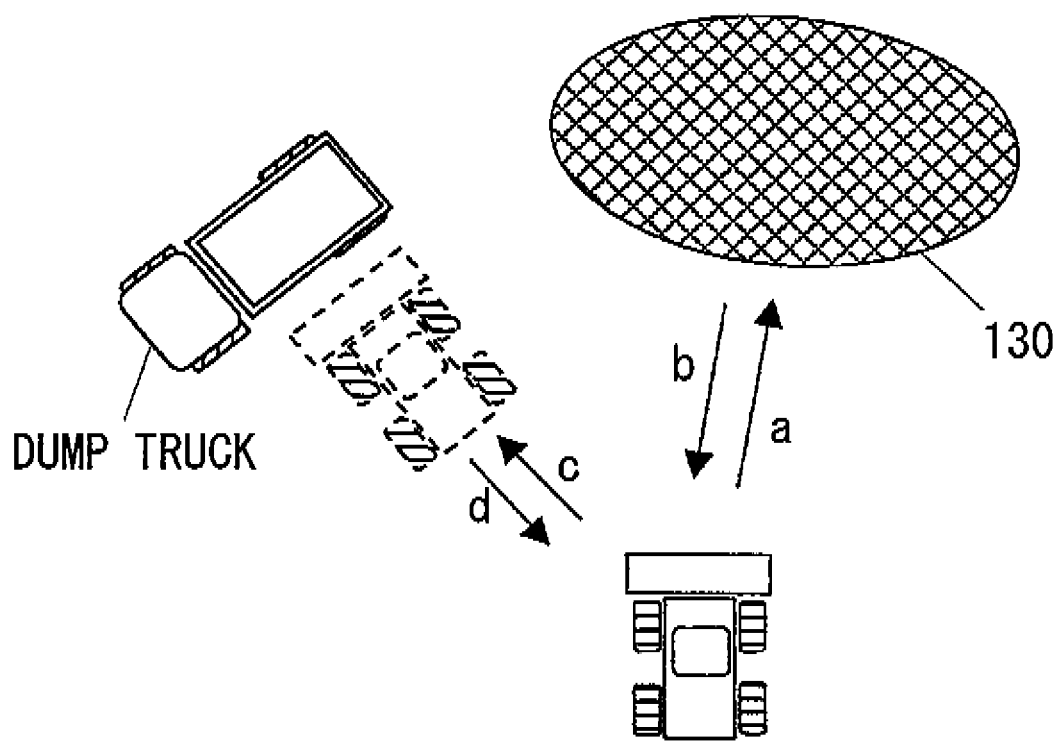
FIG. 5 is a diagram showing V-shape loading that is one of methods for loading soil etc. to a dump truck.
Figure 6:
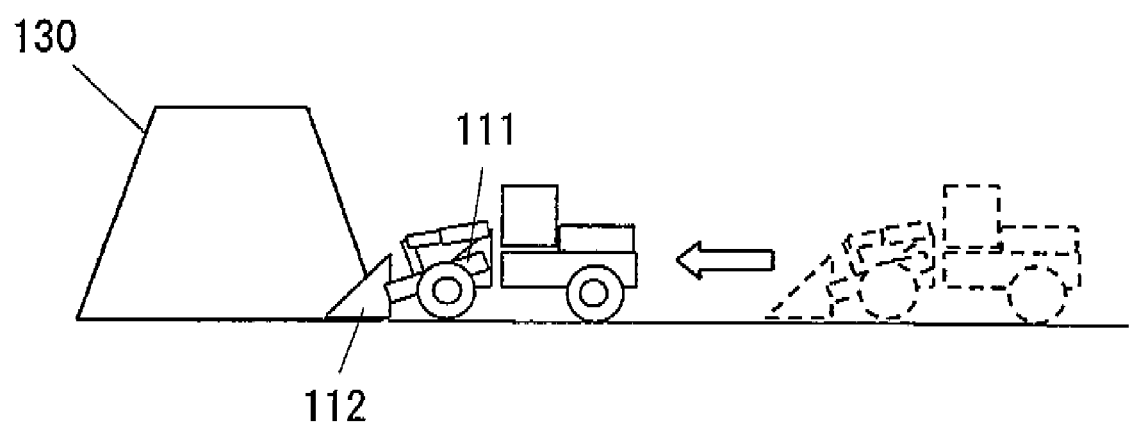
FIG. 6 is a diagram showing excavation work by a wheel loader.

FIG. 5 is a diagram showing V-shape loading that is one of methods for loading soil etc. to a dump truck. FIG. 6 is a diagram showing excavation work by the wheel loader. In the V-shape loading, the wheel loader is advanced toward a natural ground 130, such as soil, as shown by an arrow a.

As shown in FIG. 6, excavation work is performed by the following: the bucket 112 is thrust into the natural ground 130; the arm 111 is operated upwardly after the bucket 112 is operated; or only the arm 111 is finally operated upwardly while the bucket 112 and the arm 111 are simultaneously operated.

When the excavation work is finished, the wheel loader is once backed as shown by an arrow b of FIG. 5. As shown by an arrow c, the wheel loader is advanced toward the dump truck, is stopped in front of the dump truck, and loads scooped soil etc. onto the dump truck, and as shown by an arrow d, the wheel loader is backed to an original position. The above is a basic operation of excavation and loading works by the V-shape loading.

For example, when the wheel loader being backed as shown by the arrow b of FIG. 5 is advanced as shown by the arrow c during the above-described excavation and loading works, an operator performs return operation of the accelerator pedal 152, performs switching operation of the forward and reverse switching switch 17 from reverse to forward, and performs stepping operation of the accelerator pedal 152. Furthermore, in consideration of the loading work in the dump truck, the arm operation lever may be operated to an upward side to thereby raise the arm 111 in the transition from reverse to forward. Inertia energy of the vehicle body to rearward acts on the engine 190 as a load through the torque converter 2 in the transition from reverse to forward. For this reason, when switching operation of the forward and reverse switching switch 17 is performed, engine output torque needed to drive the vehicle body and the front work device is insufficient, and engine stall easily occurs.

In the present embodiment, since the pump absorption torque characteristic B as mentioned above is set, engine stall in transition from reverse to forward is prevented as will be explained next. Namely, although the engine rotational speed decreases due to the return operation of the accelerator pedal 152 in the transition from reverse to forward, as shown in FIG. 3B, the maximum pump absorption torque decreases according to decrease of the engine rotational speed, and the maximum pump absorption torque is limited to a minimum value when the engine rotational speed becomes less than Nt. As described above, even though inertia energy of the vehicle body to rearward acts on the engine 190 as a load in the transition from reverse to forward, engine stall is prevented by the maximum pump absorption torque being limited.

In the present embodiment, although the engine output torque characteristic is changed according to the remaining amount of the urea water as the characteristics A0, A1, and A2, and the maximum value of the torque in the engine output torque characteristic is decreased (the maximum torque points Tm0, Tm1, and Tm2), as mentioned above, the engine output torque characteristic with respect to the engine rotational speed is set to be the same in all the characteristics A0, A1, and A2 when the engine rotational speed is in a low rotational speed region.

Namely, as shown in FIG. 3A, the engine output torque characteristic A1 selected at the first limited stage is set to be the same characteristic as the engine output torque characteristic A0 in the range where the engine rotational speed is not less than the minimum rotational speed Ns and not more than the threshold value Nq1. In addition, the engine output torque characteristic A2 selected at the second limited stage is set to be the same characteristic as the engine output torque characteristic A0 in the range where the engine rotational speed is not less than the minimum rotational speed Ns and not more than the threshold value Nq2. Consequently, torque maximum values (torque values in the maximum torque points Tm0, Tm1, and Tm2) in the respective engine output torque characteristics can be decreased according to decrease of the remaining amount of the urea water, and an engine output can be prevented from decreasing when the engine rotational speed is in the low rotational speed region. The operator's attention can be called about the decrease of the urea water by decreasing the torque maximum value and, for example, engine stall in the transition from reverse to forward can be prevented by preventing the decrease of the engine output in the low rotational speed region.

Figure 7:
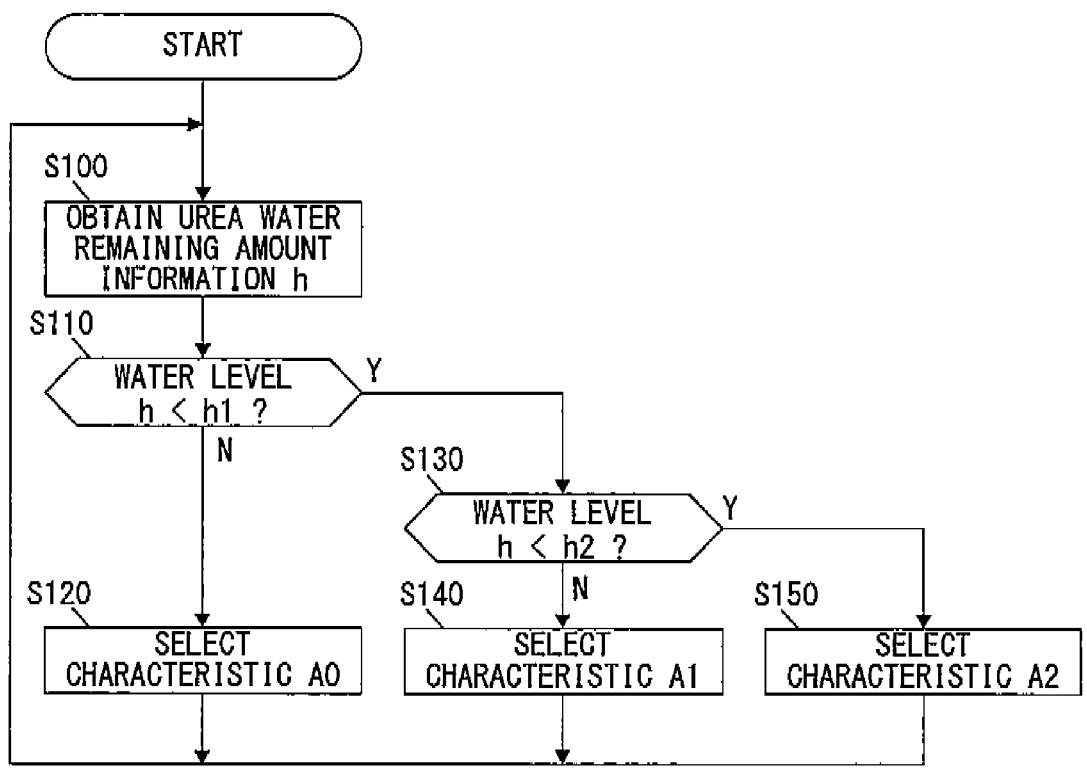
FIG. 7 is a flow chart showing operation of limiting control processing of engine output torque by a controller.

Hereinafter, limiting control of engine output torque performed according to the remaining amount of the urea water will be explained using a flow chart of FIG. 7. FIG. 7 is the flow chart showing operation of limiting control processing of engine output torque by the controller 10. When an ignition switch (not shown) is turned on, a program that performs processing shown in FIG. 7 is started, and is repeatedly executed by the controller 10.

In step S100, information on a remaining amount detected by the remaining amount sensor 163, i.e., on a water level in the urea water tank 162 is obtained, and the processing proceeds to step S110.

In step S110, the remaining amount determination unit 10*a* determines whether or not the remaining amount h of the urea water obtained in step S100 is less than the first predetermined amount h1. If negative determination is performed in step S110, the remaining amount determination unit 10*a* determines the urea water to be in the unlimited stage, and the processing proceeds to step S120, while if affirmative determination is performed, the processing proceeds to step S130.

In step S120, the selection unit 10*b* selects the engine output torque characteristic A0 from the storage device, and the processing returns to step S100.

In step S130, the remaining amount determination unit 10*a* determines whether or not the remaining amount h of the urea water obtained in step S100 is less than the second predetermined amount h2. If negative determination is performed in step S130, the remaining amount determination unit 10*a* determines the urea water to be in the first limited stage, and the processing proceeds to step S140, while if affirmative determination is performed, the remaining amount determination unit 10*a* determines the urea water to be in the second limited stage, and the processing proceeds to step S150.

In step S140, the selection unit 10*b* selects the engine output torque characteristic A1 from the storage device, and the processing returns to step S100.

In step S150, the selection unit 10*b* selects the engine output torque characteristic A2 from the storage device, and the processing returns to step S100.

As described above, in the present embodiment, the engine output torque characteristic is changed in stages according to the decrease of the urea water remaining amount. The controller 10 controls a fuel injection amount of the engine 190 based on the target engine rotational speed by the accelerator pedal 152 and the actual rotational speed detected by the rotational speed sensor 13 with reference to characteristic tables (A0, A1, and A2) selected by the selection unit 10*b*. The controller 10 calculates a maximum pump absorption torque value based on the actual rotational speed detected by the rotational speed sensor 13 with reference to the characteristic table B, and controls the displacement of the hydraulic pump 11 so as not to exceed the maximum pump absorption torque based on the discharge pressure (load pressure) detected by the pressure sensor 12 and the actual rotational speed detected by the rotational speed sensor 13.

Consequently, even though the engine 190 is controlled to the low output according to the decrease of the remaining amount of the urea water, the change amount of the engine rotational speed at the time of the change in the operation state of the vehicle can be reduced. As a result, even though the engine 190 is controlled to the low output, movement of the vehicle can be made smooth. In addition, fuel consumption (fuel efficiency) can be improved. Hereinafter, the above will be explained in detail using the torque diagrams.

As shown in FIG. 4A, the torque converter input torque and the engine rotational speed become values of the matching point MC0 in the traveling system single operation state in the unlimited stage, and the pump absorption torque and the engine rotational speed in the work system single operation state in the unlimited stage become values of the matching point MB0. The matching point MC0 is located on a droop line DL0 in the engine output torque characteristic A0. In other words, the engine rotational speed at the matching point MC0 is higher than the engine rotational speed at the rated point P0. In addition, the torque value at the matching point MC0 is lower than the torque value at the rated point P0. A difference between an engine rotational speed NC0 in the traveling system single operation state in the unlimited stage and an engine rotational speed NB0 in the work system single operation state becomes $\Delta$N0.

As shown in FIG. 4A, the torque converter input torque and the engine rotational speed become values of the matching point MC1 in the traveling system single operation state in the first limited stage, and the pump absorption torque and the engine rotational speed in the work system single operation state in the first limited stage become values of the matching point MB1. The matching point MC1 is located on a droop line DL1 in the engine output torque characteristic A1. In other words, the engine rotational speed at the matching point MC1 is higher than the engine rotational speed at the rated point P1. In addition, the torque value at the matching point MC1 is lower than the torque value at the rated point P1. A difference between an engine rotational speed NC1 in the traveling system single operation state in the first limited stage and an engine rotational speed NB1 in the work system single operation state becomes $\Delta$N1.

As shown in FIG. 4A, the torque converter input torque and the engine rotational speed become values of the matching point MC2 in the traveling system single operation state in the second limited stage, and the pump absorption torque and the engine rotational speed in the work system single operation state in the second limited stage become values of the matching point MB2. The matching point MC2 is located on a droop line DL2 in the engine output torque characteristic A2. In other words, the engine rotational speed at the matching point MC2 is higher than the engine rotational speed at the rated point P2. In addition, the torque value at the matching point MC2 is lower than the torque value at the rated point P2. A difference between an engine rotational speed NC2 in the traveling system single operation state in the second limited stage and an engine rotational speed NB2 in the work system single operation state becomes $\Delta$N2. Note that magnitude relations of the engine rotational speeds in the respective stages become NC0>NC1>NC2 and NB0>NB1>NB2.

As shown in FIG. 4B, the torque converter input torque and the engine rotational speed become values of the matching point MC3 in the compound operation state in the unlimited stage. The torque converter input torque and the engine rotational speed become values of the matching point MC4 in the compound operation state in the first limited stage. The torque converter input torque and the engine rotational speed become values of the matching point MC5 in the compound operation state in the second limited stage.

A difference between the engine rotational speed NC0 in the traveling system single operation state in the unlimited stage and an engine rotational speed NC3 in the compound operation state becomes $\Delta$N3 (not shown). A difference between the engine rotational speed NC1 in the traveling system single operation state in the first limited stage and an engine rotational speed NC4 in the compound operation state becomes $\Delta$N4 (not shown). A difference between the engine rotational speed NC2 in the traveling system single operation state in the second limited stage and an engine rotational speed NC5 in the compound operation state becomes $\Delta$N5 (not shown). Note that a magnitude relation of the engine rotational speeds in the respective stages becomes NC3>NC4>NC5.

Figure 8B:
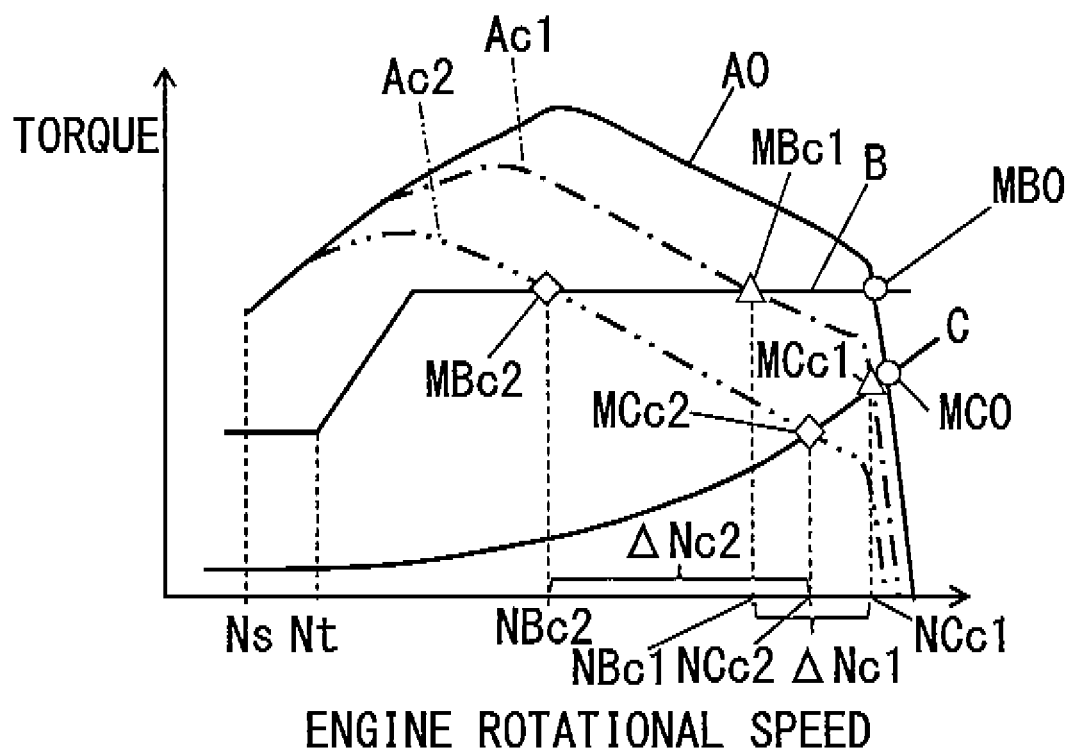
Figure 8C:
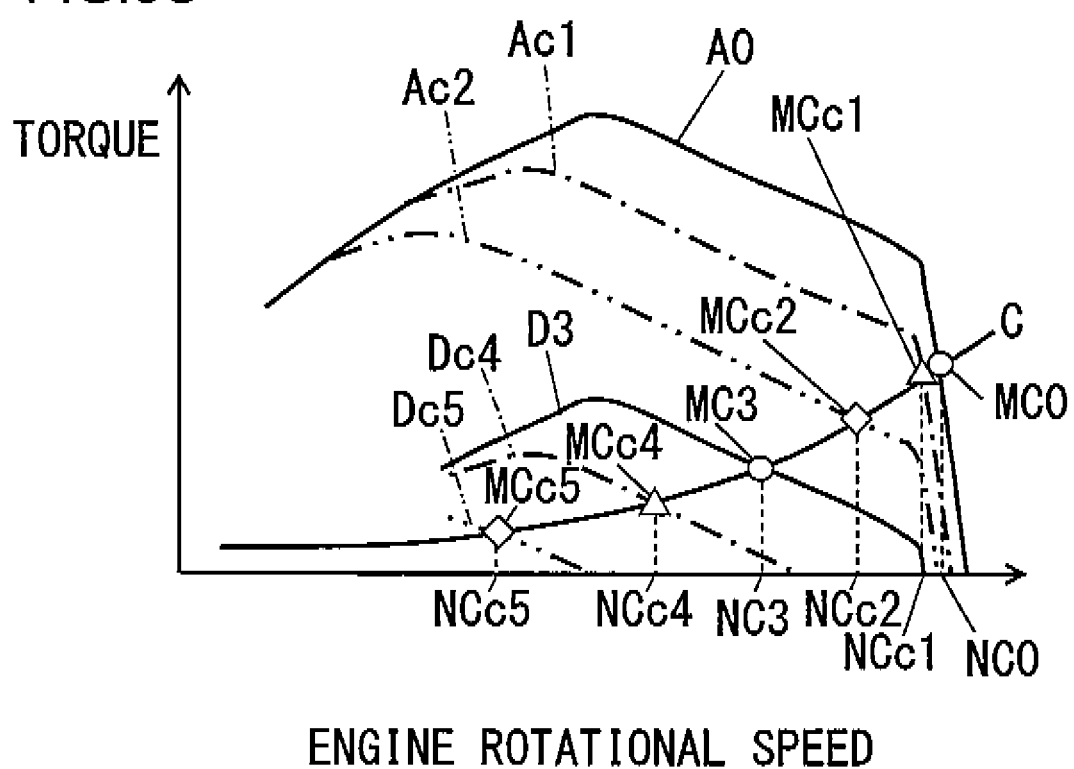

FIGS. 8A, 8B, and 8C are torque diagrams of a wheel loader according to a comparative example. FIG. 8A shows a relation between an engine rotational speed and torque when the accelerator pedal 152 is stepped at the maximum, and shows the engine output torque characteristics A0, Ac1, and Ac2, the pump absorption torque characteristic B, and the torque converter input torque characteristic C in the torque converter speed ratio e=e1. In the comparative example, the engine output torque characteristics Ac1 and Ac2 are stored in the storage device of the controller 10 instead of the engine output torque characteristics A1 and A2, which have been explained in the first embodiment. The characteristics A0, B, and C (e=e1) are similar to those in the first embodiment.

In the present embodiment, the output torque of the engine 190 is decreased according to the decrease of the remaining amount of the urea water, and the engine rotational speeds in the rated points P0, P1, and P2 of the engine 190 are decreased accordingly (refer to FIG. 3A). In contrast with this, in the comparative example, as shown in FIG. 8A, all engine rotational speeds in the rated point P0 of the characteristic A0, a rated point Pc1 of the characteristic Ac1, and a rated point Pc2 of the characteristic Ac2 are set to be NP0.

As shown in FIG. 8B, in the comparative example, the matching points MC0 and MB0 in the traveling system single operation state and the work system single operation state in the unlimited stage are the same as in the present embodiment. Meanwhile, in the comparative example, matching points in the traveling system single operation state in the first and second limited stages become MCc1 and MCc2, and matching points in the work system single operation state in the first and second limited stages become MBc1 and MBc2.

In the comparative example, the torque converter input torque and the engine rotational speed in the traveling system single operation state in the first limited stage become values of the matching point MCc1, and the pump absorption torque and the engine rotational speed in the work system single operation state become values of the matching point MBc1. A difference between an engine rotational speed NCc1 in the traveling system single operation state in the first limited stage and an engine rotational speed NBc1 in the work system single operation state becomes $\Delta$Nc1. In the comparative example, the torque converter input torque and the engine rotational speed in the traveling system single operation state in the second limited stage become values of the matching point MCc2, and the pump absorption torque and the engine rotational speed in the work system single operation state become values of the matching point MBc2. A difference between an engine rotational speed NCc2 in the traveling system single operation state in the second limited stage and an engine rotational speed NBc2 in the work system single operation state becomes ΔNc2. Magnitude relations of the engine rotational speeds in the respective stages become NC0 (refer to FIG. 4A) >NCc1>NCc2 and NB0 (refer to FIG. 4A) >NBc1>NBc2. Note that the characteristics Ac1 and Ac2 may be set so that the matching points MBc1 and MBc2 become the same as the matching points MB1 and MB2 of the present embodiment.

Magnitude relations between each of the differences ΔN1 and ΔN2 (refer to FIG. 4A) of the engine rotational speeds of the present embodiment, and each of the differences ΔNc1 and ΔNc2 (refer to FIG. 8B) of the engine rotational speeds of the comparative example become ΔN1<ΔNc1 and ΔN2<ΔNc2. That is, in the present embodiment, in a case where the engine output torque characteristic is changed according to the decrease of the urea water, the difference between the engine rotational speed in the traveling system single operation state and the engine rotational speed in the work system single operation state can be reduced compared with the comparative example. As a result, in a case where the engine 190 is controlled to the low output according to the decrease of the remaining amount of the urea water, the change of the engine rotational speed at the time of transition from the traveling system single operation state to the work system single operation state, or at the time of transition from the work system single operation state to the traveling system single operation state can be reduced, and the wheel loader can be smoothly made to work. Furthermore, since change in the engine rotational speed becomes small, fuel consumption improves.

FIG. 8C is the torque diagram in which the characteristics D3, Dc4, and Dc5 are additionally described to the torque diagram of FIG. 8A. The characteristic D3 is the characteristic in which pump absorption torque represented by the characteristic B is subtracted from the characteristic A0, the characteristic Dc4 is the characteristic in which the pump absorption torque represented by the characteristic B is subtracted from the characteristic Ac1, the characteristic Dc5 is the characteristic in which the pump absorption torque represented by the characteristic B is subtracted from the characteristic Ac2, and they are engine output torque usable in the traveling system, respectively.

In the comparative example, a difference between the engine rotational speed in the compound operation state and the engine rotational speed in the traveling system single operation state becomes as follows in each stage. As shown in FIG. 8C, the torque converter input torque and the engine rotational speed become the matching point MC3 that is the same as in the present embodiment in the compound operation state in the unlimited stage. The torque converter input torque and the engine rotational speed become values of a matching point MCc4 in the compound operation state in the first limited stage. The torque converter input torque and the engine rotational speed become a matching point MCc5 in the compound operation state in the second limited stage.

The difference between the engine rotational speed NC0 in the traveling system single operation state in the unlimited stage and the engine rotational speed NC3 in the compound operation state becomes ΔN3 (not shown) that is the same as in the present embodiment. A difference between the engine rotational speed NCc1 in the traveling system single operation state in the first limited stage and the engine rotational speed NCc4 in the compound operation state becomes ΔNc4 (not shown). A difference between the engine rotational speed NCc2 in the traveling system single operation state in the second limited stage and the engine rotational speed NCc5 in the compound operation state becomes ΔNc5 (not shown). Note that a magnitude relation of the engine rotational speeds in the respective stages becomes NC3>NCc4>NCc5. Note that the characteristics Ac1 and Ac2 may be set so that the matching points MCc4 and MCc5 become the same as the matching points MC4 and MC5 of the present embodiment.

Magnitude relations between each of the differences ΔN4 and ΔN5 of the engine rotational speeds of the present embodiment, and each of the differences ΔNc4 and ΔNc5 of the engine rotational speeds of the comparative example become ΔN4<ΔNc4 and ΔN5<ΔNc5. That is, in the present embodiment, in the case where the engine output torque characteristic is changed according to the decrease of the urea water, the difference between the engine rotational speed in the traveling system single operation state and the engine rotational speed in the compound operation state can be reduced compared with the comparative example. As a result, in the case where the engine 190 is controlled to the low output according to the decrease of the remaining amount of the urea water, the change of the engine rotational speed at the time of the transition from the traveling system single operation state to the compound operation state, or at the time of the transition from the compound operation state to the traveling system single operation state can be reduced, and the wheel loader can be smoothly made to work. Furthermore, since the change in the engine rotational speed becomes small, fuel consumption improves.

According to the first embodiment explained above, next operational effects can be obtained.

(1) The output torque of the engine 190 was decreased according to the decrease of the remaining amount of the urea water in the urea water tank 162, and the rotational speed of the engine 190 in the rated point was decreased. In the present embodiment, the engine rotational speed for obtaining the rated output in each of the characteristics A0, A1, and A2 is set so as to be smaller in stages according to the decrease of the remaining amount of the urea water. In other words, each characteristic is set so that the engine maximum rotational speed at the time of no load of the pump becomes smaller in order of the characteristics A0, A1, and A2. In more other words, each characteristic is set so that the engine rotational speed of the matching point in the predetermined torque converter speed ratio e becomes smaller in order of the characteristics A0, A1, and A2.

Consequently, the operator can recognize that there is a little remaining amount of the urea water since an operation state is getting worse compared with an ordinary time. That is, according to the present embodiment, high-output operation in a state where the remaining amount of the urea water has decreased is prevented, and the operator can be urged to replenish the urea water.

Note that since a highest vehicle speed in each speed stage decreases, traveling acceleration slightly decreases, and an operation speed of the front work device decreases by decreasing the rotational speed of the engine 190 in the rated point, the operator can be urged more clearly to replenish the urea water compared with the above-mentioned comparative example (refer to FIGS. 8A-8C).

Since the differences of the engine rotational speeds that change among the work system single operation state, the traveling system single operation state, and the compound operation state can be suppressed, the wheel loader can be smoothly made to work also in a state where the urea water remaining amount has decreased to a predetermined amount, and where the engine output has decreased. In addition, fuel consumption can be improved in the state where the urea water remaining amount has decreased to the predetermined amount, and where the engine output has decreased.

(2) Even in a case where the remaining amount of the urea water decreased, and where the stage changed from the unlimited stage to the first limited stage, the output torque of the engine 190 was made not to decrease in a range where the actual rotational speed of the engine 190 was not more than the threshold value Nq1. Even in a case where the remaining amount of the urea water decreased, and where the stage changed from the first limited stage to the second limited stage, the output torque of the engine 190 was made not to decrease in a range where the actual rotational speed of the engine 190 was not more than the threshold value Nq2. Consequently, engine stall in a state where the engine 190 is rotating in the low rotational speed region can be prevented. For example, engine stall in the transition from reverse to forward can be prevented. That is, in the present embodiment, even in a case where the urea water decreases, and where the engine output torque decreases, the operator can continue his work, and can replenish the urea water at a desired time after completing predetermined work.

(3) Maximum absorption torque of the hydraulic pump 11 was gradually increased according to rise of the actual rotational speed in the range where the actual rotational speed of the engine 190 was not less than Nt and less than Nu. Consequently, engine stall in the state where the engine 190 is rotating in the low rotational speed region can be prevented also in the state where the remaining amount of the urea water has decreased, and where the engine output has decreased. For example, engine stall in the transition from reverse to forward can be prevented. That is, in the present embodiment, even in the case where the urea water decreases, and where the engine output torque decreases, the operator can continue his work, and can replenish the urea water at the desired time after completing predetermined work.

Second Embodiment

A second embodiment of the present invention will be explained with reference to FIGS. 9, 10A, and 10B. Note that the same symbol is attached to the same portion as the first embodiment or a portion corresponding thereto, and that a difference from the first embodiment is mainly explained. A point where the second embodiment differs from the first embodiment is a configuration of a traveling drive device (traveling system). The wheel loader according to the first embodiment was provided with the traveling drive device that transmits a drive force of the engine 190 to the tires through the torque converter 2. In contrast with this, a wheel loader according to the second embodiment is provided with an HST traveling drive device in which a pump and a motor have been connected to each other in a closed circuit.

Figure 9:
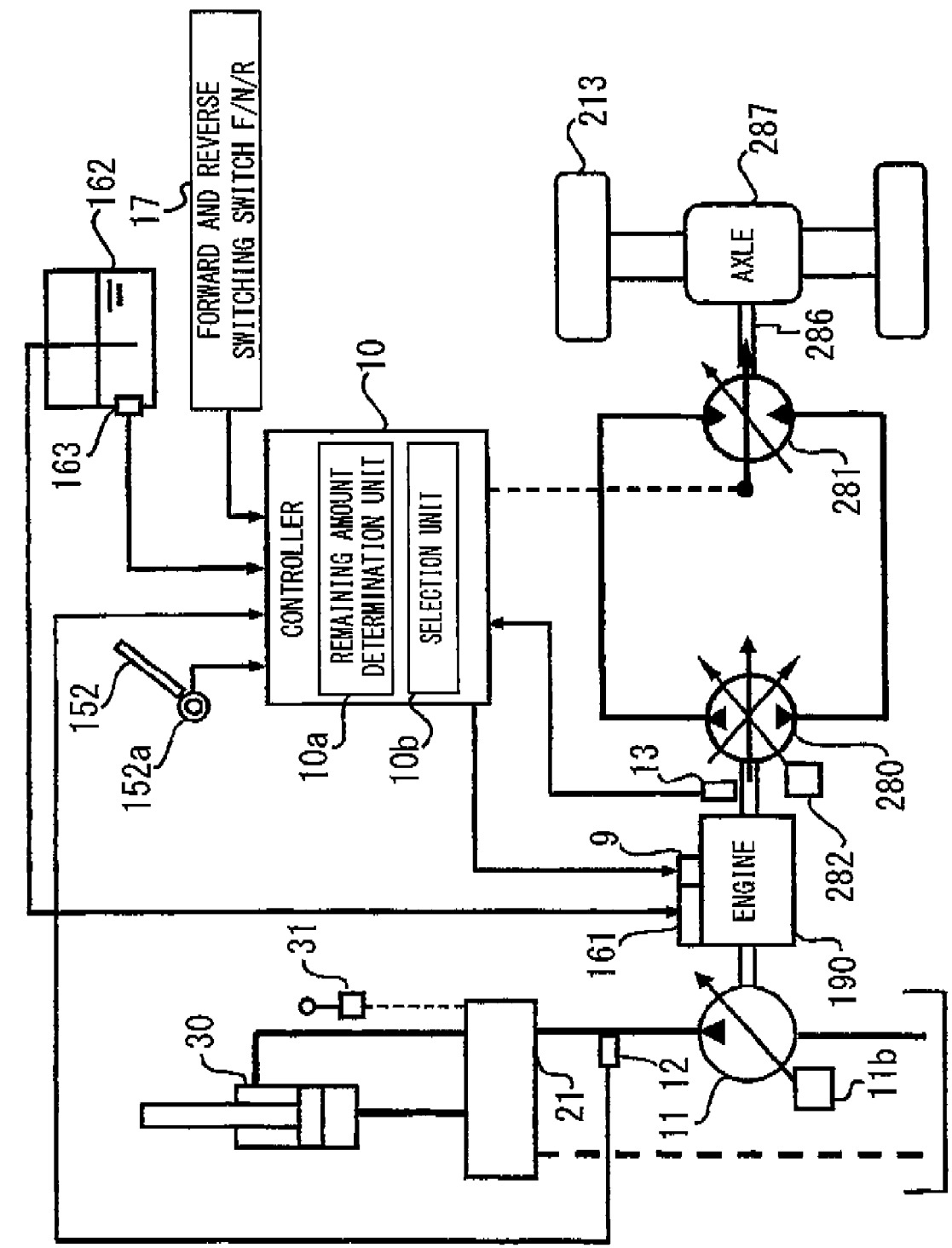
FIG. 9 is a diagram showing a schematic configuration of a wheel loader according to a second embodiment of the present invention.

FIG. 9 is a diagram showing a schematic configuration of the wheel loader according to the second embodiment. As shown in FIG. 9, the wheel loader has a hydraulic pump (hereinafter described as an HST pump 280) driven by the engine 190, and a hydraulic motor 281 that is connected to an HST pump 280 in a closed circuit. When the hydraulic motor 281 rotates by pressure oil discharged from the HST pump 280, output torque of the hydraulic motor 281 is transmitted to an output shaft 286 through a gearbox, which is not shown. Consequently, tires 213 rotate through an axle 287 and the vehicle travels.

The HST pump 280 is a swash plate type or a bent axis type variable displacement hydraulic pump in which a displacement is changed according to a tilt angle. The displacement is controlled by a regulator 282. Although not shown, the regulator 282 has a tilt cylinder, and a forward and reverse switching valve that is switched according to operation of the forward and reverse switching switch 17. A control pressure is supplied to the tilt cylinder through the forward and reverse switching valve, the displacement is controlled according to the control pressure, and also an operation direction of the tilt cylinder is controlled according to the switching of the forward and reverse switching valve, and a tilt direction of the HST pump 280 is controlled.

The control pressure rises in proportion to increase in an engine rotational speed, and the rise of the control pressure increases the displacement of the HST pump 280. As a result, when the engine rotational speed increases, both of a rotational speed of the HST pump 280 and the displacement increase, thus a discharge flow amount of the HST pump 280 increases smoothly and with good responsiveness according to the increase in the engine rotational speed, and smooth and powerful acceleration can be obtained.

The hydraulic motor 281 is a variable displacement motor, a control signal is output to a tilt control device, which is not shown, from the controller 10, and a displacement (motor capacity) is controlled.

Figure 10A:
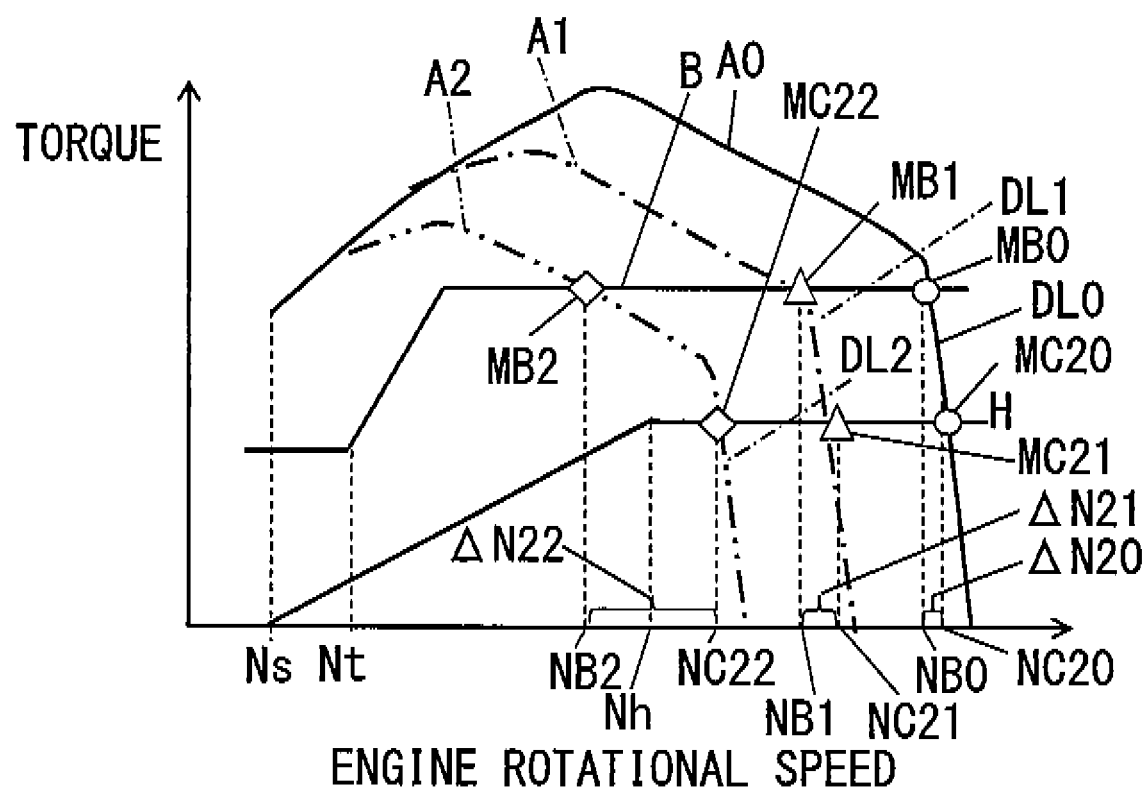
FIG. 10A is a torque diagram of the wheel loader according to the second embodiment of the present invention.

FIG. 10A is a torque diagram of the wheel loader according to the second embodiment. FIG. 10A is the diagram similar to FIG. 4A, and in FIG. 10A, a pump input torque characteristic H of the HST pump 280 is shown instead of the torque converter input torque characteristic C of FIG. 4A. As shown in FIG. 10A, in the pump input torque characteristic H of the HST pump 280, torque increases according to rise of the engine rotational speed in a range where the engine rotational speed is not less than the minimum rotational speed Ns and less than Nh, and torque becomes maximum one regardless of the engine rotational speed in a range where the engine rotational speed is not less than Nh. The same characteristics A0, A1, A2, and B as in the first embodiment are stored in the storage device of the controller 10 in a form of a lookup table.

As shown in FIG. 10A, the HST pump input torque and the engine rotational speed become values of a matching point MC20 in the traveling system single operation state in the unlimited stage, and the pump absorption torque and the engine rotational speed in the work system single operation state in the unlimited stage become values of the matching point MB0. The matching point MC20 is located on the droop line DL0 in the engine output torque characteristic A0. In other words, the engine rotational speed at the matching point MC20 is higher than the engine rotational speed at the rated point P0. In addition, the torque value at the matching point MC20 is lower than the torque value at the rated point P0. A difference between an engine rotational speed NC20 in the traveling system single operation state in the unlimited stage and the engine rotational speed NB0 in the work system single operation state becomes ΔN20.

The HST pump input torque and the engine rotational speed become values of a matching point MC21 in the traveling system single operation state in the first limited stage, and the pump absorption torque and the engine rotational speed in the work system single operation state in the first limited stage become the values of the matching point MB1. The matching point MC21 is located on the droop line DL1 in the engine output torque characteristic A1. In other words, the engine rotational speed at the matching point MC21 is higher than the engine rotational speed at the rated point P1. In addition, the torque value at the matching point MC21 is lower than the torque value at the rated point P1. A difference between an engine rotational speed NC21 in the traveling system single operation state in the first limited stage and the engine rotational speed NB1 in the work system single operation state becomes ΔN21.

The HST pump input torque and the engine rotational speed become values of a matching point MC22 in the traveling system single operation state in the second limited stage, and the pump absorption torque and the engine rotational speed in the work system single operation state in the second limited stage become the values of the matching point MB2. The matching point MC22 is located on the droop line DL2 in the engine output torque characteristic A2. In other words, the engine rotational speed at the matching point MC22 is higher than the engine rotational speed at the rated point P2. In addition, the torque value at the matching point MC22 is lower than the torque value at the rated point P2. A difference between an engine rotational speed NC22 in the traveling system single operation state in the second limited stage and the engine rotational speed NB2 in the work system single operation state becomes ΔN22. Note that magnitude relations of the engine rotational speeds in the respective stages become NC20>NC21>NC22 and NB0>NB1>NB2.

Figure 10B:
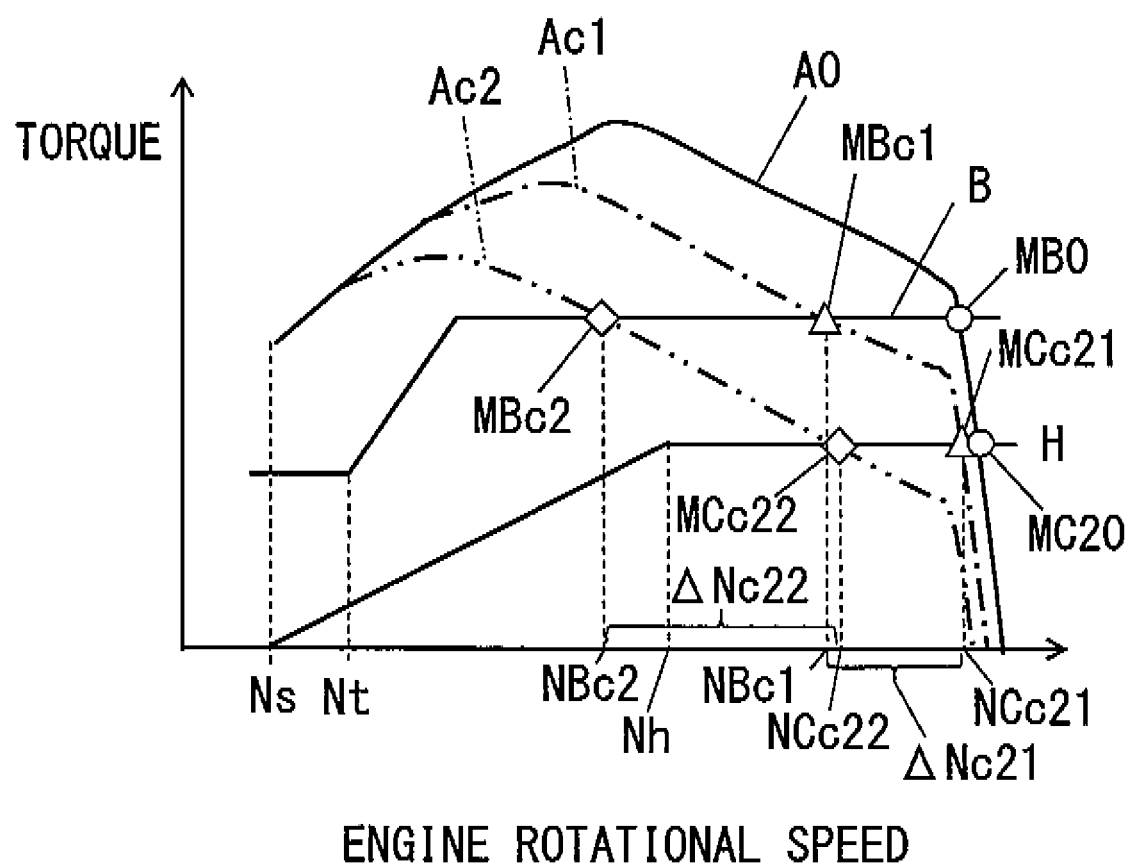
FIG. 10B is a torque diagram of the wheel loader according to the comparative example.

FIG. 10B is a torque diagram of the wheel loader according to the comparative example. The same characteristics A0, Ac1, Ac2, and B as in the comparative example (refer to FIG. 8B) explained in the first embodiment are stored in the storage device of the controller 10 according to the comparative example in a form of a lookup table. Note that the characteristics A0, B, and H are similar to those in the second embodiment.

In the comparative example, the matching points MC20 and MB0 in the traveling system single operation state and the work system single operation state in the unlimited stage are the same as in the second embodiment. Meanwhile, in the comparative example, the matching points in the traveling system single operation state in the first and second limited stages become MCc21 and MCc22, and the matching points in the work system single operation state in the first and second limited stages become MBc1 and MBc2.

In the comparative example, the HST pump input torque and the engine rotational speed in the traveling system single operation state in the first limited stage become values of the matching point MCc21, and the pump absorption torque and the engine rotational speed in the work system single operation state become values of the matching point MBc1. A difference between an engine rotational speed NCc21 in the traveling system single operation state in the first limited stage and the engine rotational speed NBc1 in the work system single operation state becomes ΔNc21. In the comparative example, the HST pump input torque and the engine rotational speed in the traveling system single operation state in the second limited stage become values of the matching point MCc22, and the pump absorption torque and the engine rotational speed in the work system single operation state become values of the matching point MBc2. A difference between an engine rotational speed NCc22 in the traveling system single operation state in the second limited stage and the engine rotational speed NBc2 in the work system single operation state becomes ΔNc22. Magnitude relations of the engine rotational speeds in the respective stages become NC20 (refer to FIG. 10A) >NCc21>NCc22 and NB0 (refer to FIG. 10A) >NBc1>NBc2. Note that the characteristics Ac1 and Ac2 may be set so that the matching points MBc1 and MBc2 become the same as the matching points MB1 and MB2 of the second embodiment.

Magnitude relations between each of the differences ΔN21 and ΔN22 of the engine rotational speeds of the second embodiment, and each of the differences ΔNc21 and ΔNc22 of the engine rotational speeds of the comparative example become ΔN21<ΔNc21 and ΔN22<ΔNc22. That is, in the case where the engine output torque characteristic is changed according to the decrease of the urea water, the difference between the engine rotational speed in the traveling system single operation state and the engine rotational speed in the work system single operation state can be made small compared with the comparative example. As a result, in the case where the engine 190 is controlled to the low output according to the decrease of the remaining amount of the urea water, the change of the engine rotational speed at the time of transition from the traveling system single operation state to the work system single operation state, or at the time of transition from the work system single operation state to the traveling system single operation state can be reduced, and the wheel loader can be smoothly made to work. Furthermore, since change in the engine rotational speed becomes small, fuel consumption improves.

Note that although not shown, also in the second embodiment, in the case where the engine output torque characteristic is changed according to the decrease of the urea water, the change of the engine rotational speed at the time of the transition from the traveling system single operation state to the compound operation state, or at the time of the transition from the compound operation state to the traveling system single operation state can be reduced, and the wheel loader can be smoothly made to work. Furthermore, since the change in the engine rotational speed becomes small, fuel consumption improves.

According to such second embodiment, operational effects similar to (1) explained in the first embodiment are exerted. Furthermore, similarly to (2) and (3) explained in the first embodiment, occurrence of engine stall in a low rotational speed region can be prevented. When a characteristic of pump absorption torque is set constant regardless of the engine rotational speed in the wheel loader made to travel by the HST traveling drive device, a difference between maximum pump absorption torque and maximum engine output torque becomes small in the low rotational speed region. For this reason, when a load corresponding to a relief pressure of the hydraulic pump 11 acts in the low rotational speed region, engine stall might occur. In the present embodiment, the output torque of the engine 190 is made not to decrease in the low rotational speed region. In addition, the maximum pump absorption torque is set to be a minimum value in a range where the engine rotational speed is less than Nt, and maximum absorption torque of the hydraulic pump 11 is gradually increased according to rise of the engine rotational speed in a range where the engine rotational speed is not less than Nt. Consequently, even in a case where the load corresponding to the relief pressure of the hydraulic pump 11 acts in the low rotational speed region, engine stall is prevented from occurring. That is, in the present embodiment, even in the case where the urea water decreases, and where the engine output torque decreases, the operator can continue his work, and can replenish urea water at the desired time after completing predetermined work.

The following modifications also fall within the scope of the present invention, and it is also possible to combine one or more modified examples with the above-mentioned embodiments.

(1) Although in the above-mentioned embodiments, the example has been explained where an engine output torque characteristic is changed according to the three stages of the unlimited stage, the first limited stage, and the second limited stage, the present invention is not limited to this. For example, stages may be separated into four or more stages, and the engine output torque characteristic may be changed.

(2) The present invention is not limited only to the case of changing the engine output torque characteristic in stages, and the characteristic may be continuously changed.

(3) Although in the above-mentioned embodiment, the engine output torque characteristic A1 is made to match with the engine output torque characteristic A0 in the range where the engine rotational speed is not more than the threshold value Nq1, and the engine output torque characteristic A2 is made to match with the engine output torque characteristic A0 in the range where the engine rotational speed is not more than the threshold value Nq2, the present invention is not limited to this. A threshold value for deciding an engine rotational speed range where the engine output torque characteristic is not decreased may not be changed in each stage. In other words, the threshold values Nq1 and Nq2 may be set to be the different values (Nq1>Nq2) in the first limited stage and the second limited stage as mentioned above, or may be set to be the same value (Nq1=Nq2) in the first limited stage and the second limited stage.

(4) Although in the above-mentioned embodiments, the example has been explained where the engine output torque characteristic and the pump absorption torque characteristic are stored in the storage device of the controller 10 in the form of the lookup table, the present invention is not limited to this. For example, each characteristic may be stored in the storage device of the controller 10 in a form of a function according to the engine rotational speed.

(5) Although in the first embodiment, the matching point MC1 is located on the droop line DL1 of the characteristic A1, and the matching point MC2 is located on the droop line DL2 of the characteristic A2, the present invention is not limited to this. The matching point may be located only on the droop line of one of the characteristics A1 and A2. Although in the second embodiment, the matching point MC21 is located on the droop line DL1 of the characteristic A1, and the matching point MC22 is located on the droop line DL2 of the characteristic A2, the present invention is not limited to this. The matching point may be located only on the droop line of one of the characteristics A1 and A2.

(6) Although the wheel loader has been exemplarily explained as one example of the work vehicle in the above-mentioned embodiments, the present invention is not limited to this and, for example, other work vehicles, such as a forklift, a telehandler, a lift truck may be employed.

The present invention is not limited to the above-described embodiments unless features of the present invention is impaired, other modes that can be considered within the scope of the technical idea of the present invention are also included within the scope of the present invention.

What is claimed is:

1. A work vehicle including a front work device, comprising:
   a variable displacement hydraulic pump that is driven by an engine and supplies pressure oil to an actuator that drives the front work device;
   an exhaust gas purification device that purifies nitrogen oxide in exhaust gas discharged from the engine using a reducing agent solution stored in a reducing agent tank;
   a remaining amount detection device that detects a remaining amount of the reducing agent solution in the reducing agent tank;
   a control unit that controls the engine with an engine output characteristic in which output torque of the engine is decreased and also a rotational speed of the engine is decreased in a rated point according to a decrease of the remaining amount of the reducing agent solution detected by the remaining amount detection device; and
   a rotational speed detection unit that detects an actual rotational speed of the engine, wherein
      when the actual rotational speed of the engine detected by the rotational speed detection unit is not more than a first threshold value, the control unit does not decrease the output torque of the engine regardless of the remaining amount of the reducing agent solution detected by the remaining amount detection device, and
      the control unit sets a maximum absorption torque of the hydraulic pump to be a minimum in a range where the actual rotational speed of the engine detected by the rotational speed detection unit is less than a second threshold value, sets the maximum absorption torque of the hydraulic pump to be a maximum in a range where the actual rotational speed of the engine is not less than a third threshold value, and gradually increases the maximum absorption torque of the hydraulic pump according to rise of the actual rotational speed in a range where the actual rotational speed of the engine is not less than the second threshold value and less than the third threshold value.

2. The work vehicle according to claim 1, wherein the output torque of the engine is decreased in stages according to the decrease of the remaining amount of the reducing agent solution detected by the remaining amount detection device.

3. A work vehicle including a front work device, comprising:
   a variable displacement hydraulic pump that is driven by an engine and supplies pressure oil to an actuator that drives the front work device;
   an exhaust gas purification device that purifies nitrogen oxide in exhaust gas discharged from the engine using a reducing agent solution stored in a reducing agent tank;
   a remaining amount detection device that detects a remaining amount of the reducing agent solution in the reducing agent tank;
   a control unit that decreases output torque of the engine and also decreases a rotational speed of the engine in a rated point according to decrease of the remaining amount of the reducing agent solution detected by the remaining amount detection device; and
   a rotational speed detection unit that detects an actual rotational speed of the engine, wherein
      when the actual rotational speed of the engine detected by the rotational speed detection unit is not more than a first threshold value, the control unit does not decrease the output torque of the engine regardless of the remaining amount of the reducing agent solution detected by the remaining amount detection device, and
      the control unit sets maximum absorption torque of the hydraulic pump to be a minimum in a range where the actual rotational speed of the engine detected by the rotational speed detection unit is less than a second threshold value, sets the maximum absorption torque of the hydraulic pump to be a maximum in a range where the actual rotational speed of the engine is not less than a third threshold value, and gradually increases the maximum absorption torque of the hydraulic pump according to rise of the actual rotational speed in a range where the actual rotational speed of the engine is not less than the second threshold value and less than the third threshold value.

4. The work vehicle according to claim 3, wherein
the output torque of the engine is decreased in stages according to the decrease of the remaining amount of the reducing agent solution detected by the remaining amount detection device.

* * * * *